(12) United States Patent
Schleyer

(10) Patent No.: US 9,103,844 B2
(45) Date of Patent: Aug. 11, 2015

(54) IMPULSE TRANSMITTER AND METHOD FOR PRODUCING SAME

(75) Inventor: Mathias Schleyer, Kempten (DE)

(73) Assignee: KNORR-BREMSE SYSTEME FUER NEUTZFAHRZEUGE GMBH, Muenchen (DE)

( * ) Notice: Subject to any disclaimer, the term of this patent is extended or adjusted under 35 U.S.C. 154(b) by 252 days.

(21) Appl. No.: 12/998,352

(22) PCT Filed: Oct. 28, 2009

(86) PCT No.: PCT/EP2009/007698
§ 371 (c)(1),
(2), (4) Date: Jul. 11, 2011

(87) PCT Pub. No.: WO2010/049131
PCT Pub. Date: May 6, 2010

(65) Prior Publication Data
US 2011/0260713 A1    Oct. 27, 2011

(30) Foreign Application Priority Data
Oct. 30, 2008 (DE) .......................... 10 2008 054 001

(51) Int. Cl.
*G01P 3/481* (2006.01)
*G01P 1/02* (2006.01)
(Continued)

(52) U.S. Cl.
CPC .............. *G01P 1/026* (2013.01); *G01D 11/245* (2013.01); *G01P 3/488* (2013.01); *Y10T 29/49004* (2015.01)

(58) Field of Classification Search
CPC ............ G01P 1/02; G01P 3/481; G01D 11/24

USPC .............. 324/160, 174, 175, 207.15, 207.25, 324/239, 261, 262; 29/602.1, 606; 336/65–68, 92
See application file for complete search history.

(56) References Cited

U.S. PATENT DOCUMENTS

| 3,838,372 | A | 9/1974 | Damijonaitis |
| 4,680,543 | A | 7/1987 | Kohen |

(Continued)

FOREIGN PATENT DOCUMENTS

| DE | 21 54 847 | 5/1973 |
| DE | 33 44 959 | 8/1985 |

(Continued)

OTHER PUBLICATIONS

European Patent Office, International Preliminary Report on Patentability and Written Opinion, May 12, 2011, from International Patent Application No. PCT/EP2009/007698, filed on Oct. 28, 2009.

(Continued)

*Primary Examiner* — Arleen M Vazquez
*Assistant Examiner* — Robert P Alejnikov, Jr.
(74) *Attorney, Agent, or Firm* — Kenyon & Kenyon LLP

(57) ABSTRACT

A pulse-type rotation speed transducer and a method for manufacturing the same are described. The pulse-type rotation speed transducer has, as inductive components, a central pole pin, a coil coaxially disposed as a pickup winding around the pole pin and measurement leads, a permanent magnet that is in effective connection with the pole pin, and a sleeve disposed coaxially around the pole pin and the coil. Spacers of an intermediate product ensure coaxial disposition in the context of testing cycles and measurement cycles, cavities within the sleeve being filled with a plastic compound in the context of the final product, accompanied by embedding of the components.

8 Claims, 4 Drawing Sheets

(51) Int. Cl.
*G01D 11/24* (2006.01)
*G01P 3/488* (2006.01)

(56) References Cited

U.S. PATENT DOCUMENTS

| | | | | |
|---|---|---|---|---|
| 5,039,942 A | * | 8/1991 | Buchschmid et al. | 324/174 |
| 5,341,117 A | | 8/1994 | Singbartl | |
| 5,426,844 A | | 6/1995 | Suda et al. | |
| 5,563,510 A | * | 10/1996 | Gorrell et al. | 324/174 |
| 5,896,029 A | * | 4/1999 | Singbartl | 324/173 |
| 7,096,566 B2 | * | 8/2006 | Du et al. | 29/596 |

FOREIGN PATENT DOCUMENTS

| | | | |
|---|---|---|---|
| DE | 35 30 288 | 3/1987 | |
| DE | 37 06 168 | 9/1988 | |
| DE | 3902218 | 8/1990 | |
| DE | 41 34 279 | 4/1993 | |
| DE | 195 07 028 | 9/1996 | |
| DE | 10 2004 021032 | 11/2005 | |
| EP | 0 282 967 | 9/1988 | |
| JP | 2005236844 A * | 9/2005 | H04R 11/02 |

OTHER PUBLICATIONS

European Patent Office, Translation of International Preliminary Report on Patentability and Written Opinion, May 12, 2011, from International Patent Application No. PCT/EP2009/007698, filed on Oct. 28, 2009.

Office Action dated Feb. 27, 2013 of the corresponding German Application No. 102008054001.3.

* cited by examiner

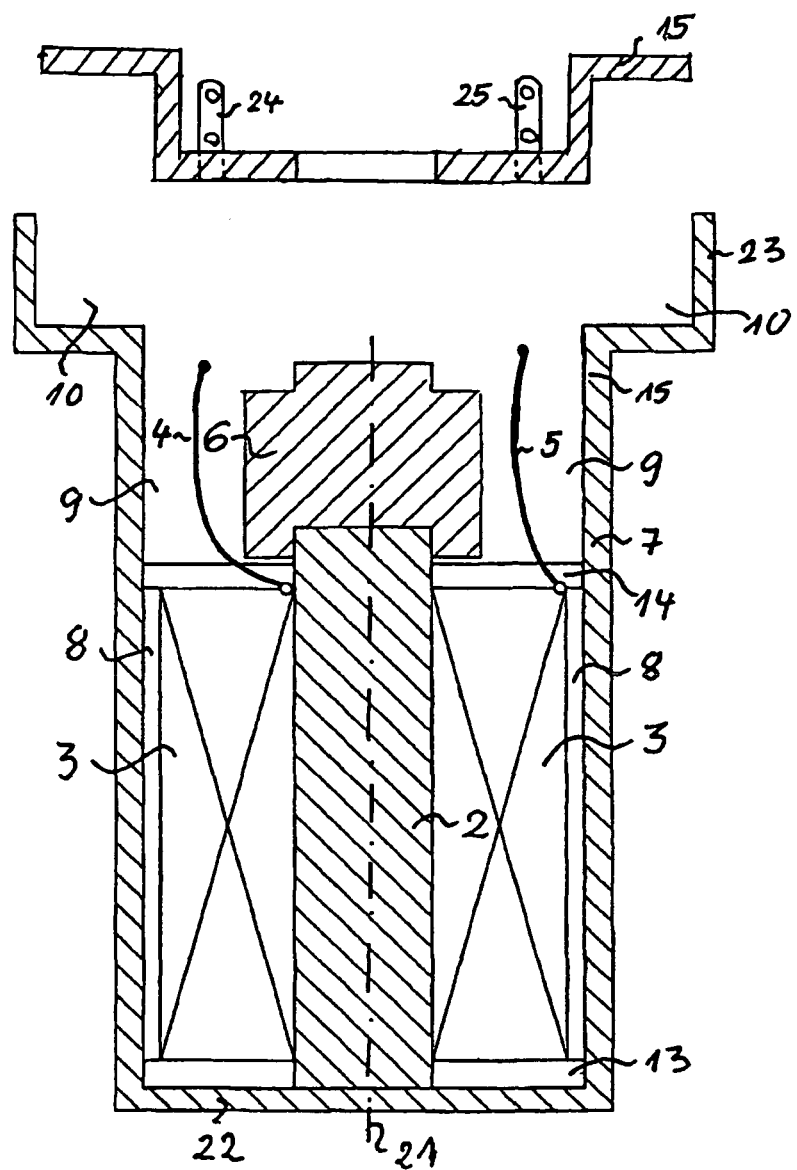

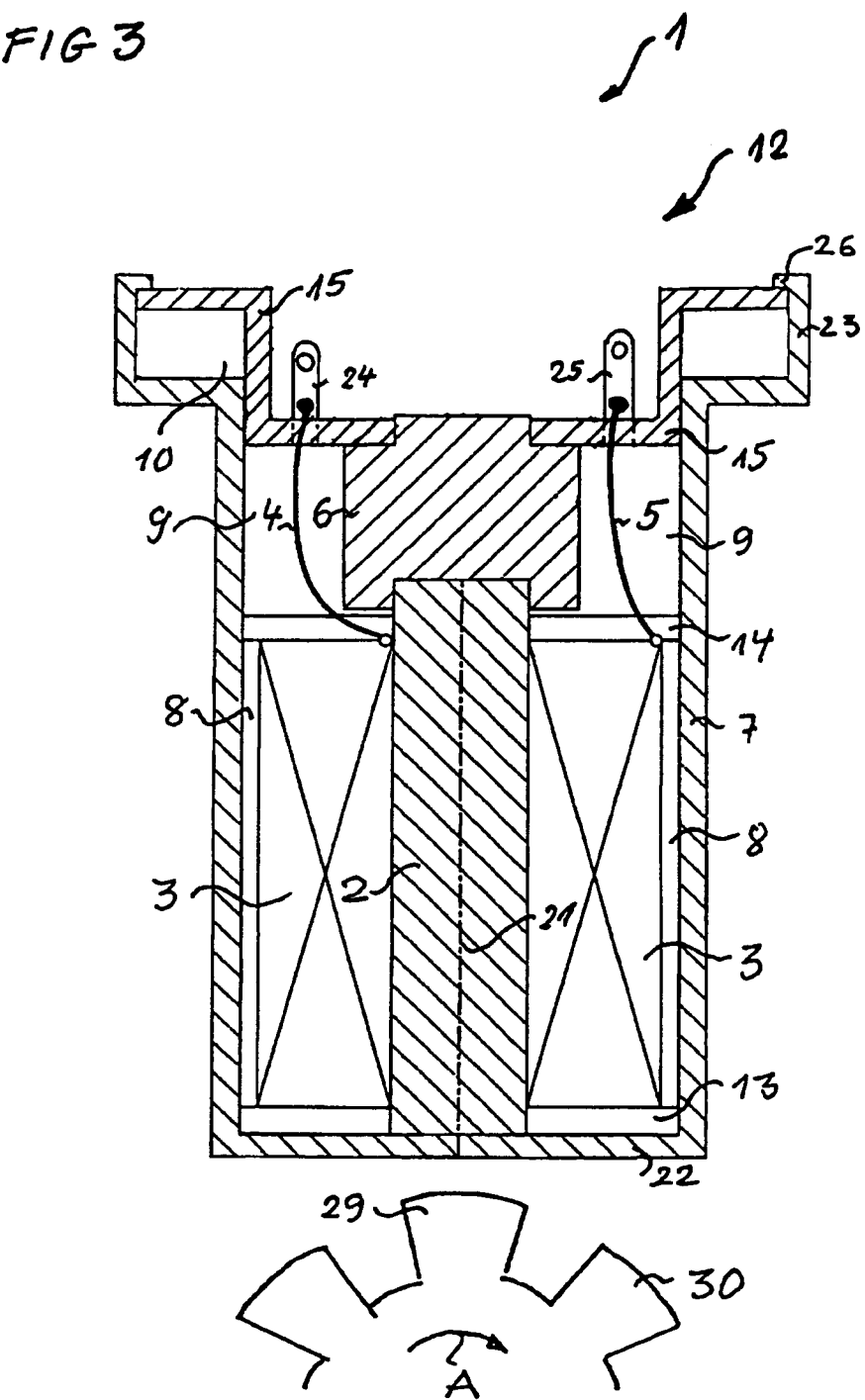

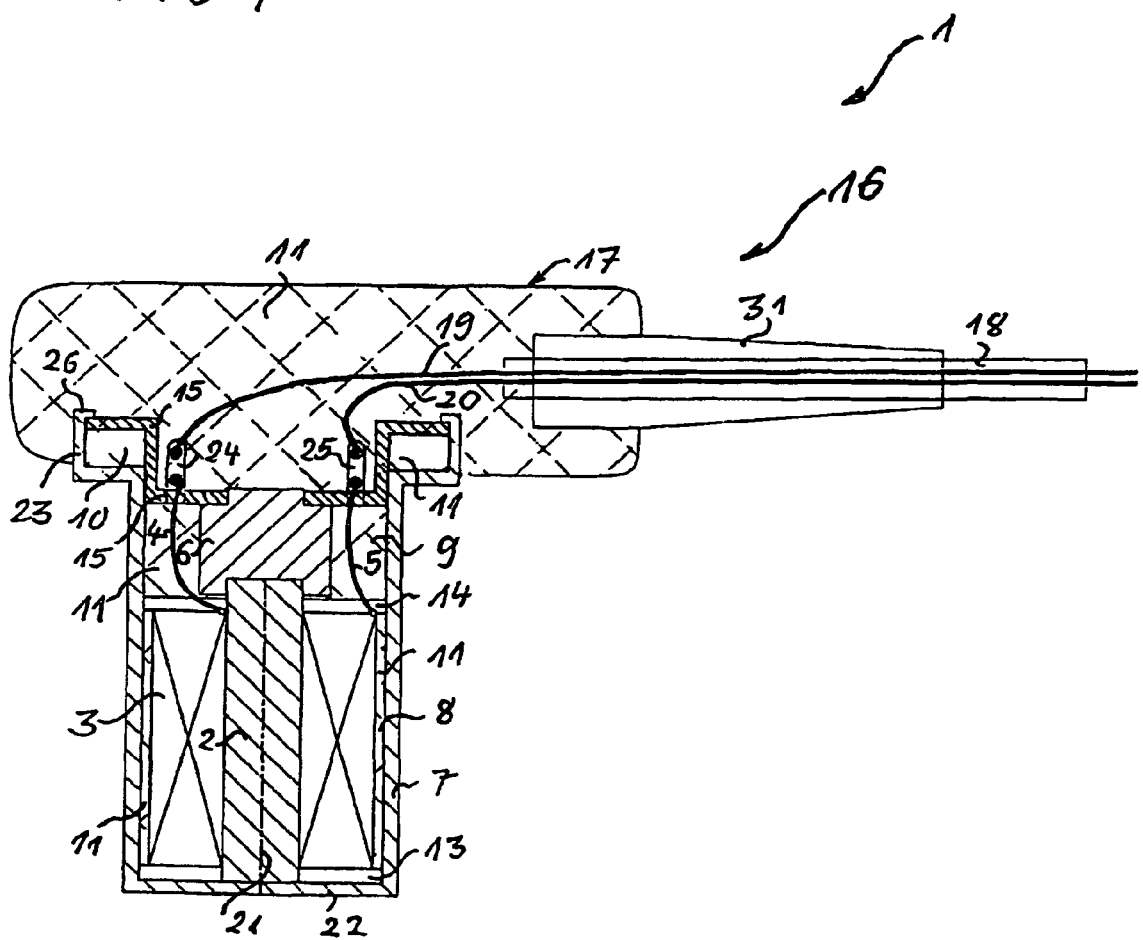

IMPULSE TRANSMITTER AND METHOD FOR PRODUCING SAME

FIELD OF THE INVENTION

The present invention relates to a pulse-type rotation speed transducer and to a method for manufacturing the same. The pulse-type rotation speed transducer has, as inductive components, a central pole pin, a coil coaxially disposed as a pickup winding around the pole pin and having measurement leads, a permanent magnet that is in effective connection with the pole pin, and a sleeve disposed coaxially around the pole pin and the coil.

BACKGROUND INFORMATION

A pulse-type rotation speed transducer of this kind is discussed in German patent document DE 33 44 959, the pulse-type rotation speed transducer possessing a hollow pin having a stepped cross section that decreases toward the rotor. A disadvantage of this pulse-type rotation speed transducer is that coaxial positioning of the pole pin, coil, and permanent magnet is ensured solely by centering spacers, so that the considerable vibrations that, in vehicle engineering (and in particular in commercial vehicle engineering), act on such pulse-type rotation speed transducers can jeopardize both the coaxial alignment and the contacting of the coil windings to two measurement leads, so that this configuration represents a reliability problem for vibration-affected continuous operation in a vehicle.

SUMMARY OF THE INVENTION

An object of the exemplary embodiments and/or exemplary methods of the present invention is to overcome the disadvantages in the existing art and to describe a pulse-type rotation speed transducer, along with a method for manufacturing it, with which reliability in continuous operation can be improved.

This object may be achieved with the exemplary embodiments and/or exemplary methods of the present invention described herein, and advantageous refinements are evident from the further descriptions herein.

According to the exemplary embodiments and/or exemplary methods of the present invention, a pulse-type rotation speed transducer and a method for manufacturing the same are created. The pulse-type rotation speed transducer has, as inductive components, a central pole pin, a coil coaxially disposed as a pickup winding around the pole pin and having measurement leads, a permanent magnet that is in effective connection with the pole pin, and a sleeve disposed coaxially around the pole pin and the coil. In this context, spacers of a fully functional intermediate product ensure coaxial disposition in the context of testing cycles and measurement cycles, and in the final products, cavities within the sleeve are filled with a plastic compound accompanied by embedding of the components.

This pulse-type rotation speed transducer has the advantage, as compared with the existing art, that its coaxially disposed inductive components, and the measurement leads to the coil windings, are protected by the plastic compound from stresses due to vibration. They are protected, for example, from detachment of the measurement leads or breakage of the measurement leads as a result of the embedding thereof when the cavities within the sleeve are filled by a plastic compound. This pulse-type rotation speed transducer further has the advantage that a plurality of adaptations of the intermediate product to predefined standards for measurement cable connectors, measurement cable lengths, measurement cable diameters, measurement cable transitions in the form of adapters to the pulse-type rotation speed transducer or to connecting elements that are externally accessible in the context of the intermediate product of the pulse-type rotation speed transducer, can be embedded and/or shaped in when the cavities are filled.

The result, advantageously, is on the one hand to increase the degree of production automation, and on the other hand to enable final assembly of the sensors in the various markets, such as NAFTA, China, or the EU. In particular, different presentations of the measurement cables are possible, with many variations in terms of cable length, connector shape, corrugated tube, and markings or customer numbers on the measurement leads, once the intermediate product has already been successfully tested in corresponding testing cycles and measurement cycles.

Distribution of the production process to different sites is thereby also made possible, in which context the site for the intermediate product can be very far away from the "final assembly" location. A further advantage is the fact that during shipment between the production site of the intermediate product and the final assembly location, the sensitive coil windings are protected, by the metallic sleeve of the intermediate and final product, from storage and transport damage.

Because the cavities of the intermediate product in the surrounding protective sleeve are filled, and because a collar of the sleeve is shaped or injection-embedded along with an adapter to the measurement cable, model complexity in terms of the measurement cables and connectors can be taken into account in a much later production process. In addition, less wear on the injection-molding tool may occur.

In an exemplary embodiment of the present invention, the sleeve encompasses a metal alloy, measurement terminals in the form of connecting elements being externally accessible. This advantageously ensures that for the testing and measurement phase, the intermediate product already ensures access to the measurement leads of the coil.

Provision is further made that the pulse-type rotation speed transducer, as a testing, measurement, and intermediate product, encompasses the sleeve having the coaxially disposed inductive components and the externally accessible connecting elements, the coaxial disposition of the inductive components being ensured by spacers in the sleeve. With such spacers the pole pin, the coil, and the permanent magnet, in particular, can be centered with respect to one another.

Provision is further made that as a final product, the testing, measurement, and intermediate product has cavities filled with the plastic compound and has an adapter made of plastic compound having electrical connectors of a measurement cable to the measurement leads. As already mentioned above, this introduction of the plastic compound into the cavities, and the shaping of an adapter having electrical connections to the measurement cable, can be accomplished in a single injection molding step at the final assembly location.

A method for manufacturing a pulse-type rotation speed transducer having inductive components has the following method steps: Firstly the inductive components, in the form of a central pole pin, a coil as pickup winding having measurement leads, and a permanent magnet for interacting with the pole pin, are manufactured. By preference, the turns of the pickup winding are wound directly onto the pole pin between radial spacers constituting axial delimiters.

In addition, a metal sleeve and further spacers are made available for coaxial disposition of the inductive components in the sleeve. This is then followed by assembly of the pulse-type rotation speed transducer with spacers and inductive components and with connecting elements that are accessible from outside the sleeve, to yield an intermediate product. Testing cycles and measurement cycles can then be carried out with the intermediate product. The essential core of a pulse-type rotation speed transducer of this kind can thus be accomplished at a production site that can be far away from a final assembly location.

For final assembly, after successful testing cycles and measurement cycles in a variety of application sectors the intermediate product can be shipped to the final assembly site and, on site, filled with a plastic compound accompanied by embedding of the inductive components in the sleeve. Simultaneously with filling of the sleeve, an adapter made of plastic compound, having connections to the measurement leads, can be attached to the sleeve using the injection molding method. Only a single injection molding step is necessary for this, in order to fill the sleeve with plastic and shape on the adapter.

The advantage associated with this method is that manufacture of the intermediate product can occur at a geographical distance from manufacture of the final product. It is only at the final assembly location, distributed around the world, that the various presentations in terms of more than a hundred variants of measurement cables, measurement connectors, measurement cable corrugated-tube sheaths, and markings and customer numbers on the measurement cables, can then be advantageously and economically implemented.

The exemplary embodiments and/or exemplary methods of the present invention will now be explained in more detail with reference to the appended Figures.

BRIEF DESCRIPTION OF THE DRAWINGS

FIG. 2 shows a schematic cross section through the metal sleeve according to FIG. 1 after the installation of inductive components of a pulse-type rotation speed transducer.

FIG. 3 shows a schematic cross section through a pulse-type rotation speed transducer as an intermediate product.

FIG. 4 shows a schematic cross section through the pulse-type rotation speed transducer after the filling and shaping of plastic compound into and onto the intermediate product according to FIG. 3, yielding a final product of the pulse-type rotation speed transducer.

DETAILED DESCRIPTION

Figure 1:
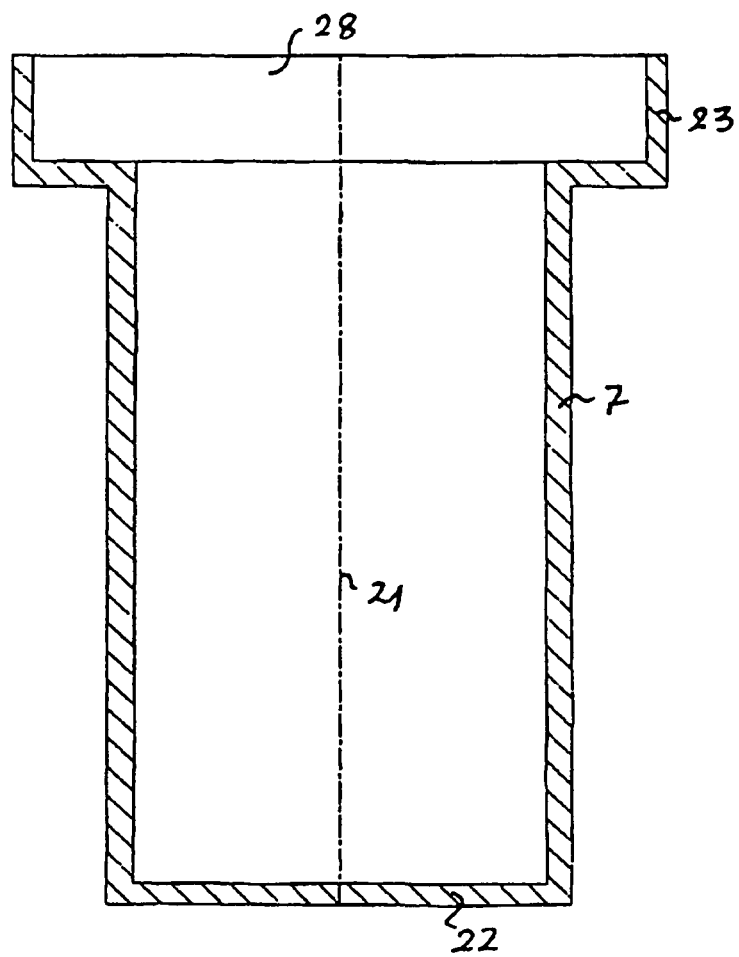
FIG. 1 shows a schematic cross section through a metal sleeve of a pulse-type rotation speed transducer.

FIG. 1 is a schematic cross section through a metal sleeve 7 of a pulse-type rotation speed transducer. Metal sleeve 7 is disposed radially symmetrically about an axis 21, and has a bottom 22 that is located opposite an open end face 28. At open end face 28, metal sleeve 7 has a collar 23 into which connecting elements can be fitted.

FIG. 2 is a schematic cross section through metal sleeve 7 according to FIG. 1, after the installation of inductive components 2, 3, 6 of a pulse-type rotation speed transducer. Inductive components 2, 3, 6 encompass a pole pin 2, disposed coaxially in sleeve 7, that with one end rests centrally on bottom 22 of metal sleeve 7 and is immobilized in that region by a radial spacer 13. The oppositely located end of pole pin 2 is connected centrally to a permanent magnet 6; a second radial spacer 14 centers pole pin 2 and permanent magnet 6 coaxially with sleeve 7. A coil 3 having measurement leads 4 and 5 is coaxially disposed about coil 2 as a pickup winding, between spacers 13 and 14. After assembly of the components to yield an intermediate product, these measurement leads 4 and 5 make contact with connecting elements 24 and 25 that are disposed on a centering holder 15. This holder 15 can be fitted into collar 23 of sleeve 7. Holder 15 is configured in such a way that it can immobilize the components in sleeve 7 axially, and permanent magnet 6 radially.

FIG. 3 is a schematic cross section through a pulse-type rotation speed transducer 1 as an intermediate product 12, after the insertion of holder 15 (shown in FIG. 2) having connecting elements 24 and 25. After insertion into collar 23 of sleeve 7, holder 15 is immobilized by the fact that collar 23 is deformed into a crimped flange 26. In addition, measurement leads 4 and 5 of coil 3 are electrically connected to connecting elements 24 and 25.

Intermediate product 12 is thus fully functional and can be tested in testing cycles and measurement cycles; intermediate product 12 can be disposed with the bottom of sleeve 7 (and pole pin 2 disposed thereon) toward a rotor 30 that is embodied as a magnet wheel, and rotary motions in arrow direction A can be imparted to rotor 30, with the result that poles 29 of the magnet wheel induce measurement pulses in the inductive components and convey them via measurement leads 4 and 5 to connecting elements 24 and 25.

FIG. 4 is a schematic cross section through pulse-type rotation speed transducer 1 after a plastic compound 11 has been filled into and shaped onto intermediate product 12 according to FIG. 3, yielding a final product 16 of pulse-type rotation speed transducer 1. For this, connecting leads 19 and 20 of a measurement cable 18 are first welded, soldered, or clamped onto connecting elements 24 and 25. An adapter 17, which also embeds a transition piece 31 to measurement cable 18 along with the filling of cavities 8, 9, and 10, is then shaped onto collar 23 of metal sleeve 7.

The manufacture and testing of intermediate product 12, as shown in FIG. 3, can occur remotely from the location at which a measurement cable 18 having adapter 17 is mounted on sleeve 7; the advantage associated with this is that adapter 17 can be adapted to the differing conformations and requirements for measurement cables at the various final assembly locations.

The "LIST OF REFERENCE CHARACTERS" is as follows:

1 Pulse-type rotation speed transducer
2 Pole pin
3 Coil
4 Measurement lead
5 Measurement lead
6 Permanent magnet
7 Sleeve
8 Cavity
9 Cavity
10 Cavity
11 Plastic compound
12 Testing, measurement, and intermediate product
13 Spacer
14 Spacer
15 Holder
16 Final product
17 Adapter
18 Measurement cable
19 Connecting lead
20 Connecting lead
21 Axis of sleeve
22 Bottom of sleeve
23 Collar of sleeve
24 Connecting element 25 Connecting element
26 Crimped flange
28 End face
29 Pole of magnet wheel
30 Rotor
31 Transition piece
A Arrow direction (rotation direction of rotor)

What is claimed is:

1. A pulse-type rotation speed transducer, comprising:
a central pole pin;
a coil coaxially disposed as a pickup winding around the central pole pin and having measurement leads;
a permanent magnet that is in effective connection with the central pole pin; and
a metal sleeve disposed coaxially around the central pole pin and the coil, wherein cavities within within a collar of the metal sleeve contain a plastic compound accompanied by embedded inductive components for a pulse-type rotation speed transducer; and
a centering holder fitted into the collar of the metal sleeve, wherein the centering holder immobilizes the pole pin and the pickup winding in the metal sleeve axially and the magnet radially;
wherein the metal sleeve is disposed radially symmetrically about an axis, and has a bottom that is located opposite an open end face, at which, the sleeve has the collar into which connecting elements are fitted, the collar being radially symmetrical about the axis and having a diameter larger than a diameter of the metal sleeve,
wherein the measurement leads project out of the metal sleeve,
wherein the pulse-type rotation speed transducer includes cavities filled with the plastic compound and an adapter made of a plastic compound having electrical connections of a measurement cable to the measurement leads, and
wherein the adapter embeds a transition piece of the measurements leads and is shaped onto the collar of the metal sleeve, so that the adapter is mounted on the metal sleeve.

2. The pulse-type rotation speed transducer of claim 1, wherein the metal sleeve comprises a metal alloy, and wherein the measurement leads project out of the metal sleeve.

3. The pulse-type rotation speed transducer of claim 2, wherein the pulse-type rotation speed transducer includes the metal sleeve having coaxially disposed inductive components and the measurement leads projecting out of the metal sleeve, and wherein the coaxial disposition of the coaxially disposed inductive components is ensured by radial spacers in the metal sleeve.

4. The pulse-type rotation speed transducer of claim 1, wherein the pole pin is disposed coaxially in the metal sleeve, so that one end rests centrally on the bottom of the metal sleeve and is immobilized in that region by a radial spacer.

5. The pulse-type rotation speed transducer of claim 4, wherein an oppositely located end of the pole pin is connected centrally to the permanent magnet, and wherein a second radial spacer centers the pole pin and the magnet coaxially with the metal sleeve.

6. The pulse-type rotation speed transducer of claim 5, wherein the coil, having the measurement leads, is coaxially disposed about the pole pin as a pickup winding, between the radial spacer and the second radial spacer.

7. The pulse-type rotation speed transducer of claim 6, wherein the measurement leads contact connecting elements disposed on the centering holder, which is fitted into the collar of the metal sleeve.

8. The pulse-type rotation speed transducer of claim 1, wherein the testing, measurement, and intermediate pulse-type rotation speed transducer product comprises the metal sleeve having the coaxially disposed inductive components and the measurement leads projecting out of the metal sleeve, and wherein the coaxial disposition of the inductive components is ensured by spacers in the metal sleeve.

* * * * *

UNITED STATES PATENT AND TRADEMARK OFFICE
CERTIFICATE OF CORRECTION

PATENT NO. : 9,103,844 B2
APPLICATION NO. : 12/998352
DATED : August 11, 2015
INVENTOR(S) : Mathias Schleyer It is certified that error appears in the above-identified patent and that said Letters Patent is hereby corrected as shown below:

On the title page, (73) Assignee, change "NEUTZFAHRZEUGE" to --NUTZFAHRZEUGE--.

Signed and Sealed this
Eighth Day of March, 2016

Michelle K. Lee
*Director of the United States Patent and Trademark Office*